United States Patent
Thommana et al.

(10) Patent No.: US 10,251,083 B2
(45) Date of Patent: Apr. 2, 2019

(54) DISRUPTION TOLERANCE IN CONTESTED ENVIRONMENTS

(71) Applicants: John Thommana, Cedar Rapids, IA (US); Lizy Paul, Cedar Rapids, IA (US)

(72) Inventors: John Thommana, Cedar Rapids, IA (US); Lizy Paul, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 503 days.

(21) Appl. No.: 14/817,808

(22) Filed: Aug. 4, 2015

(65) Prior Publication Data
US 2017/0041822 A1 Feb. 9, 2017

(51) Int. Cl.
| | | |
|---|---|---|
| H04K 3/00 | (2006.01) | |
| H04W 72/00 | (2009.01) | |
| H04W 72/04 | (2009.01) | |
| H04W 84/18 | (2009.01) | |
| H04W 28/02 | (2009.01) | |

(52) U.S. Cl.
CPC ............ *H04W 28/021* (2013.01); *H04K 3/80* (2013.01); *H04W 72/0453* (2013.01); *H04W 84/18* (2013.01); *H04W 72/005* (2013.01)

(58) Field of Classification Search
CPC ........... H04W 28/021; H04W 72/0453; H04W 84/18; H04K 3/80
See application file for complete search history.

(56) References Cited

U.S. PATENT DOCUMENTS

| | | | |
|---|---|---|---|
| 6,310,576 B1 * | 10/2001 | Johnson ................ | H04W 64/00 342/457 |
| 9,042,359 B1 | 5/2015 | Thommana et al. | |
| 2003/0078062 A1 * | 4/2003 | Burr .................... | H04W 56/002 455/502 |

(Continued)

FOREIGN PATENT DOCUMENTS

WO 1998027667 A2 6/1998

OTHER PUBLICATIONS

"Miniaturized Atomic Clock to Support Soldiers in Absence of GPS", http://www.defense-aerospace.com/cgi-bin/client/modele.pl?shop=dae&modele=release&prod=138990&cat=3; printed Jul. 7, 2015; U.K. Ministry of Defense; issued Oct. 3, 2012.

(Continued)

*Primary Examiner* — Oussama Roudani
(74) *Attorney, Agent, or Firm* — Angel N. Gerdzhikov; Donna P. Suchy; Daniel M. Barbieri

(57) ABSTRACT

A method includes determining that a first receiver of a node of a mobile ad-hoc network (MANET) is in an electromagnetic contested environment for a first frequency. The method also includes scanning a frequency coverage range of a second receiver of the node for unused frequencies. The method additionally includes selecting a frequency from the unused frequencies, the selected frequency to be used for communication of messages from another node of the MANET to the node via the second receiver. The method further includes transmitting, to the other node, a message including information of the selected frequency via the transmitter.

17 Claims, 10 Drawing Sheets

(56) References Cited

U.S. PATENT DOCUMENTS

| | | | |
|---|---|---|---|
| 2003/0199266 A1 | 10/2003 | Zavidniak | |
| 2004/0246935 A1* | 12/2004 | Joshi | H04L 45/00 370/338 |
| 2007/0123258 A1* | 5/2007 | Sawyer | H04W 36/0061 455/436 |
| 2007/0252761 A1* | 11/2007 | Koorapaty | G01S 5/0205 342/464 |
| 2014/0204823 A1* | 7/2014 | Merlin | H04W 72/005 370/312 |
| 2015/0327001 A1* | 11/2015 | Kirshenberg | H04W 28/18 455/41.2 |
| 2016/0223677 A1* | 8/2016 | Trevino | G01S 19/215 |
| 2016/0353330 A1* | 12/2016 | Naik | H04W 36/0022 |

OTHER PUBLICATIONS

"Software-Defined Radio", https://en.wikipedia.org/wiki/software-defined_radio; printed Jul. 7, 2015.

"Chip-Scale Atomic Clock", https://en.wikipedia.org/wiki/chip-scale_atomic_clock; printed Jul. 7, 2015.

"MicroGRAM GPS Receiver", Product Brochure; http://www.rockwellcollins.com/~/media/Files/Unsecure/Products/Product%20Brochures/Navigation%20and%20Guidance/GPS%20Devices/MicroGRAM%20data%20sheet.aspx; printed Jul. 7, 2015; copyright 2013 Rockwell Collins.

* cited by examiner

DISRUPTION TOLERANCE IN CONTESTED ENVIRONMENTS

CROSS-REFERENCE TO RELATED APPLICATIONS

The present application is related to U.S. patent application Ser. No. 14/038,406, filed on Sep. 26, 2013, to U.S. patent application Ser. No. 14/038,439, filed on Sep. 26, 2013, to U.S. patent application Ser. No. 14/685,455, filed on Apr. 13, 2015, to U.S. patent application Ser. No. 14/752,468, filed on Jun. 26, 2015, and to U.S. patent application Ser. No. 12/891,203, filed on Sep. 27, 2010, all of which are hereby expressly incorporated herein in their entirety.

BACKGROUND

In highly "electromagnetic (EM) Contested" environments, most waveform performance degrades substantially to a level where communications may not be possible. Legacy point-to-multipoint waveforms degrade substantially more than ad-hoc networking waveforms, which have some built-in resiliency due to "routing around" capability. Current ad-hoc networking waveforms, however, may not always provide necessary performance. For example, the resiliency of ad-hoc networking waveforms of current implementations may not be sufficient to ensure network connectivity due to exponentially increasing routing overheads and problems like islanding and network fragmentation. Additionally, currently, there is no method to determine whether nodes of an ad-hoc network are being jammed, and current anti-jam waveforms (legacy and modern ad-hoc networking) do not keep track of what EM environment they are operating in.

SUMMARY

In one aspect, embodiments of the inventive concepts disclosed herein are directed to a method. The method includes determining that a first receiver of a node of a mobile ad-hoc network (MANET) is in an electromagnetic contested environment for a first frequency. The method also includes scanning a frequency coverage range of a second receiver of the node for unused frequencies. The method additionally includes selecting a frequency from the unused frequencies, the selected frequency to be used for communication of messages from at least one other node of the MANET to the node via the second receiver. The method further includes transmitting, to the at least one other node, a message including information of the selected frequency via a first transmitter.

In a further aspect, embodiments of the inventive concepts disclosed herein are directed to a method. The method includes determining that a node of a mobile ad-hoc network (MANET) is in an electromagnetic contested environment. The method also includes determining that a link between the node and a neighbor node is a unidirectional link. The method additionally includes transmitting, to the neighbor node, a message indicating at least that the node is in the electromagnetic contested environment and that the link between the node and the neighbor node is the unidirectional link.

In a further aspect, embodiments of the inventive concepts disclosed herein are directed to a node of a mobile ad-hoc network (MANET). The node includes a radio having a first receiver, a first transmitter associated with the first receiver, and a second receive-only receiver. The radio is configured to scan a frequency coverage range of the second receive-only receiver for unused frequencies. The node also includes a processor configured to determine that the first receiver of a node of a mobile ad-hoc network (MANET) is in an electromagnetic contested environment for a first frequency. The processor is also configured to select a frequency from the unused frequencies, the selected frequency to be used for communication of messages from at least one other node of the MANET to the node via the second receive-only receiver. The radio is also configured to transmit, to the at least one other node, a message including information of the selected frequency via the first transmitter.

Additional embodiments are described in the application including the claims. It is to be understood that both the foregoing general description and the following detailed description are exemplary and explanatory only and are not restrictive. Other embodiments will become apparent.

BRIEF DESCRIPTION OF THE DRAWINGS

Other embodiments will become apparent by reference to the accompanying figures in which.

DETAILED DESCRIPTION

Figure 1:
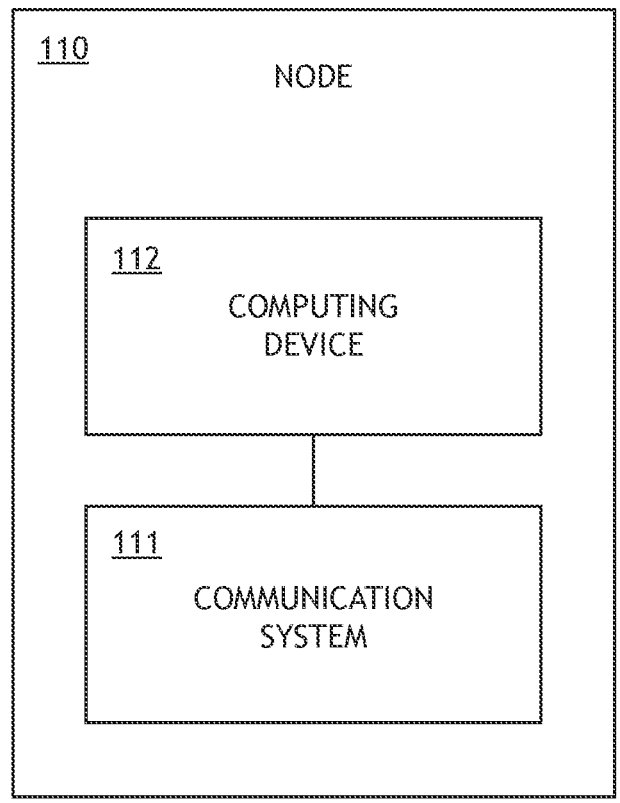
FIG. 1 shows a node of MANET of one embodiment.

Reference will now be made in detail to exemplary embodiments of the inventive concepts disclosed herein, which are illustrated in the accompanying drawings. The scope of the inventive concepts disclosed herein is limited only by the claims; numerous alternatives, modifications, and equivalents are encompassed. For the purpose of clarity, technical material that is known in the technical fields related to the embodiments of the inventive concepts disclosed herein has not been described in detail to avoid unnecessarily obscuring the description.

Embodiments of the inventive concepts disclosed herein include methods of determining whether a node is operating in an electromagnetic (EM) contested mode such that the node is being jammed or subject to EM interference. In one embodiment, a node (e.g., an operational commander node or other node) can determine that the node is being jammed by detecting that the node is not receiving responses from other nodes, and a user, automated process, or semi-automated process of the node can initiate the sending of a jamming environment message to indicate to other nodes that the node is being jammed.

Additionally, in one embodiment, a node (e.g., a node utilizing an enhanced tactical data radial system (eTDRS) waveform, a wireless networking waveform (WNW), a European Secure Software Defined Radio (ESSOR) waveform, an electronic counter-counter measure (ECCM) waveform, or other mobile ad-hoc network (MANET) waveform can determine that the node is being jammed by maintaining statistics (e.g., internal physical layer performance statistics) of various metrics, such as number of successful bursts received, cyclic redundancy check (CRC) failures, acquisition failures, slot error rate, packet error rate, or the like. For example, when a node receives a packet, the node can determine that packet was successfully received, or determine that there was some number of packet failures or that there were CRC failures. As such, the node can utilize statistics to determine whether the node is being jammed. For example, if the node determines that messages on a particular frequency are not being received or that only a beginning or end portion of messages on a particular frequency are being received, the node can determine that the node is being jammed.

In one embodiment, an external device can detect an EM jammed or contested environment with respect to one or more nodes and send messages with information of the EM jammed or contested environment to other nodes.

Embodiments may include determining that a first receiver of a node of a MANET is in an electromagnetic contested environment for a first frequency (e.g., a frequency the radio is currently using at an instant and this frequency can change in a next instant). For example, typically jammers don't jam only one frequency but a set of frequencies. The jammer typically determines the number of frequencies the radio is operating on and then jams a subset of frequencies to prevent communication.

In one embodiment, upon determination that a node is operating in an EM jammed or contested mode, the node may disseminate information (e.g., send messages) that the node is being jammed via one or more unidirectional links to other nodes. Even though the jammed node cannot receive messages from at least some nodes, the jammed node can transmit messages to other nodes to distribute information about the jammed nodes. For example, the jammed node may send a message to other nodes instructing the other nodes to communicate with the jammed node on a different frequency which is not being jammed.

In one embodiment, a network of nodes may be implemented as a MANET. A MANET does not require a centralized base station. The nodes of the MANET may create a map or routing table to determine how to communicate with each other. Each node of a MANET may send (e.g., broadcast) messages (e.g., "hello" messages) of which nodes the sending node can receive messages from. Based on received messages (e.g., "hello" messages), each node can create a network topology. For example, each node can send hello messages to first hop neighbors, and each node can determine that a link between itself and a first hop neighbor is a unidirectional link if a hello message is not received from the first hop neighbor. Through such communications, each node can create a common topology of nodes and determine whether each node is in an EM contested environment and whether only unidirectional links are available with neighboring nodes.

In one embodiment, if a node determines that it is jammed, the node can transmit messages via unidirectional links with neighboring nodes. For example, the node can determine unjammed frequencies by scanning over the frequency spectrum, and the node can send messages that may include information that the node is jammed on a particular frequency (or range of frequencies) and inform the neighboring nodes that the node can receive messages on a different frequency. As such, using unidirectional links to change communication frequencies forces a jammer to spread a finite amount of its jamming power over further frequencies which reduces the ability of the jammer to effectively jam nodes of the network.

In one embodiment, each node may include an atomic clock (e.g., a chip scale atomic clock) to reduce time drift. Including an atomic clock in a node improves time synchronization in a network. Communication in a network by frequency hopping requires both time synchronization and frequency synchronization. For example, in a situation where a node is being jammed, the node may lose the ability to receive network time synchronization messages from other nodes, and after some amount of time, the node's internal time will have drifted to the point that it cannot communicate with other nodes; however, a node with an atomic clock can maintain time synchronization over significantly longer periods and send a message via a unidirectional link to instruct other nodes to communicate with the node on a different frequency while maintaining time synchronization. Further, by maintaining time synchronization with the network, a node can send a message with a list of frequencies to communicate on at given times.

Referring now to FIG. 1, a diagram of one node 110 of a plurality of nodes of a network (e.g., a mobile ad-hoc network (MANET)) of one embodiment is depicted. The node 110 includes a communication system 111 and at least one computing device 112, as well as other systems, equipment, and devices commonly included in a node of a network (e.g., a MANET). Some or all of the communication system 111 (described in more detail with respect to FIG. 2), the computing device 112 (described in more detail with respect to FIG. 4), and other systems may be communicatively coupled. The other systems, devices, and equipment of the node 110 may include user input/output devices (e.g., a display, touchscreen display, keyboard, speakers, touchpad, buttons, vibration units, or the like), a navigation system (e.g., FMS), a wearable computing device, navigation sensors, onboard data recording system, and/or the like. The node 110 may accommodate one or more pilots, crew members, and/or passengers. The node 110 may be implemented as, on, or included in a vehicle (e.g., an aircraft, automobile, spacecraft, train, watercraft, submersible craft, or the like), a mobile device (e.g., a mobile computing device, such as tablet computing device, laptop computing device, mobile phone computing device, or the like), a mobile station (e.g., a mobile ground station, mobile air station, mobile water station, or the like), or other mobile system. A network including multiple nodes 110 may include nodes of different types (e.g., different vehicular type, different mobile station type, or the like). Additionally, while the computing device 112 and the communication system 111 are depicted as separate devices, in some embodiments the computing device 112 and the communication system 111 may be implemented as a single integrated system or device or as any number of communicatively coupled systems or devices.

Figure 2:
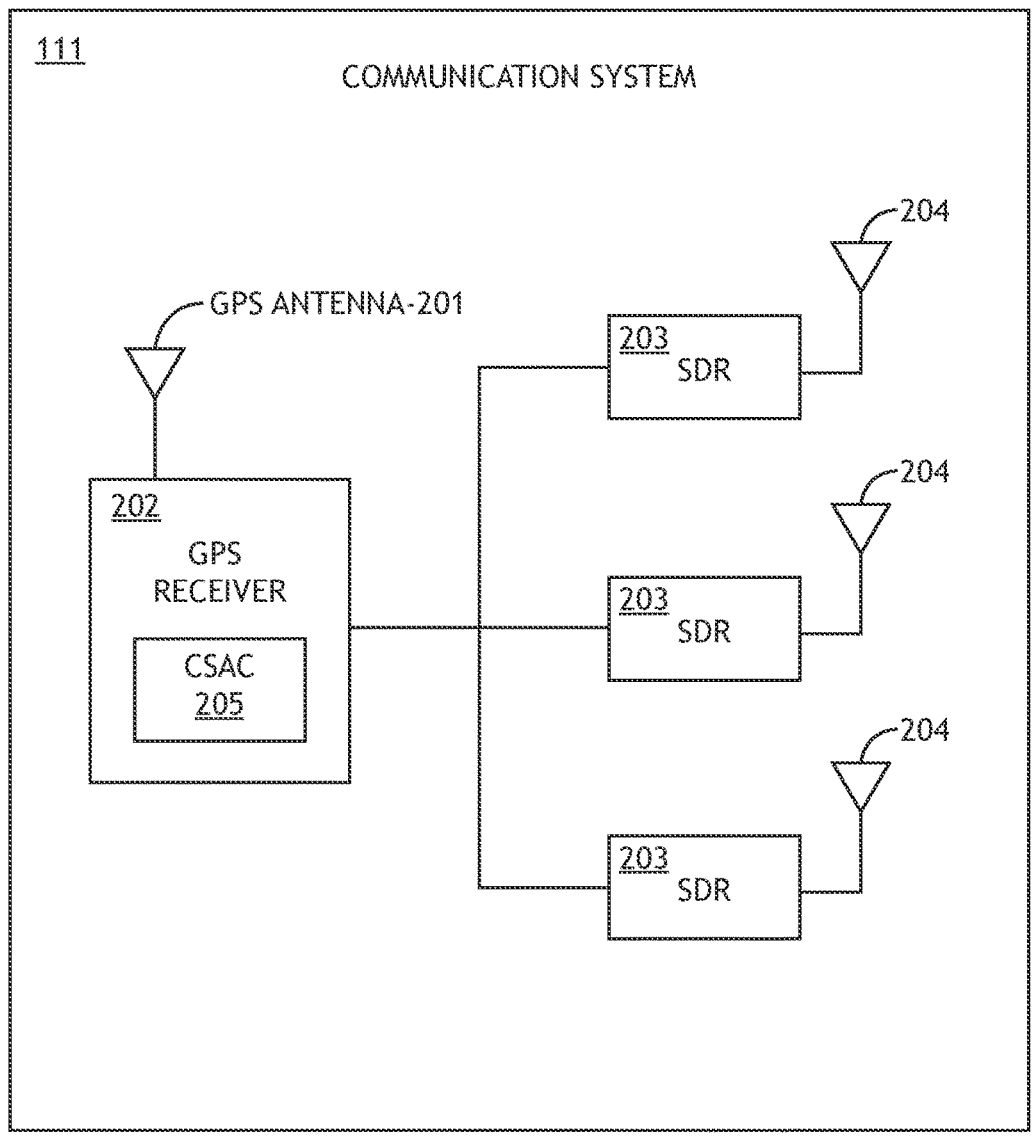
FIG. 2 depicts a communication system of a node of one embodiment.

Referring now to FIG. 2, a communication system 111 of a node 110 of one embodiment is depicted. The communication system 111 is configured to send and/or receive signals, data, and/or voice transmissions to and/or from other nodes, control stations, satellites (e.g., communication satellites or global positioning system (GPS) satellites), or combinations thereof. As shown in FIG. 2, the communication system 111 may include a GPS antenna 201, a GPS receiver 202, one or more (e.g., three, as shown) software defined radios (SDRs) 203, and one or more corresponding SDR antennas 204. Some or all of the GPS antenna 201, the GPS receiver 202, the one or more SDRs 203, and the one or more corresponding SDR antennas 204 may be communicatively coupled. While the communication system 111 is depicted as having three SDRs 203, the communication system 111 may include any suitable radio types (such as non-SDR radios, hardware based radios, or the like), a combination of SDRs and non-SDR radios, or the like, and any suitable number of radios.

The GPS receiver 202 is configured to receive GPS signals via the GPS antenna 201 from GPS satellites. The GPS receiver 202 is configured to provide accurate node position and time to the SDRs 203 and the computing device 112 so long as GPS is available. For example, the GPS receiver 202 may receive or calculate location data from a sufficient number (e.g., at least four) of GPS satellites in view of the node 110 such that a GPS solution may be calculated. The GPS receiver 202 may be configured to provide the location data to any of various equipment/ systems of a node or route the location data for transmission to an off-board source (e.g., another node). Additionally, the GPS receiver 202 may include an integrated atomic clock (e.g., chip scale atomic clock (CSAC) 205, a rubidium atomic clock, a cesium atomic clock or the like) to maintain sufficiently accurate time for extended periods (e.g., at least five days) of time when GPS is not available (e.g., being jammed). For example, the GPS receiver 202 may be implemented as a MicroGRAM GPS receiver, and the CSAC 205 may be implemented with a 1 part per billion (ppb) time drift such that the CSAC 205 will only drift 1 millisecond in 5.78 days. For example, current eTDRS waveforms can maintain synchronization with 2 milliseconds of drift, and as such, an eTDRS waveform with a CSAC 205 could operate for 11 days in a GPS denied jamming environment. While FIG. 2 is depicted with the GPS receiver 202 including an integrated CSAC 205, in other embodiments an atomic clock (e.g., CSAC 205) may be omitted or the atomic clock may be implemented elsewhere in or on the node 110 (e.g., as a separate component of the communication device 111, a separate component of the computing device 112, or as a separate component of the node 110).

Additionally, the communication system 111 may include at least one processor configured to run various software applications or computer code stored in a non-transitory computer-readable medium and configured to execute various instructions or operations.

Figure 3:
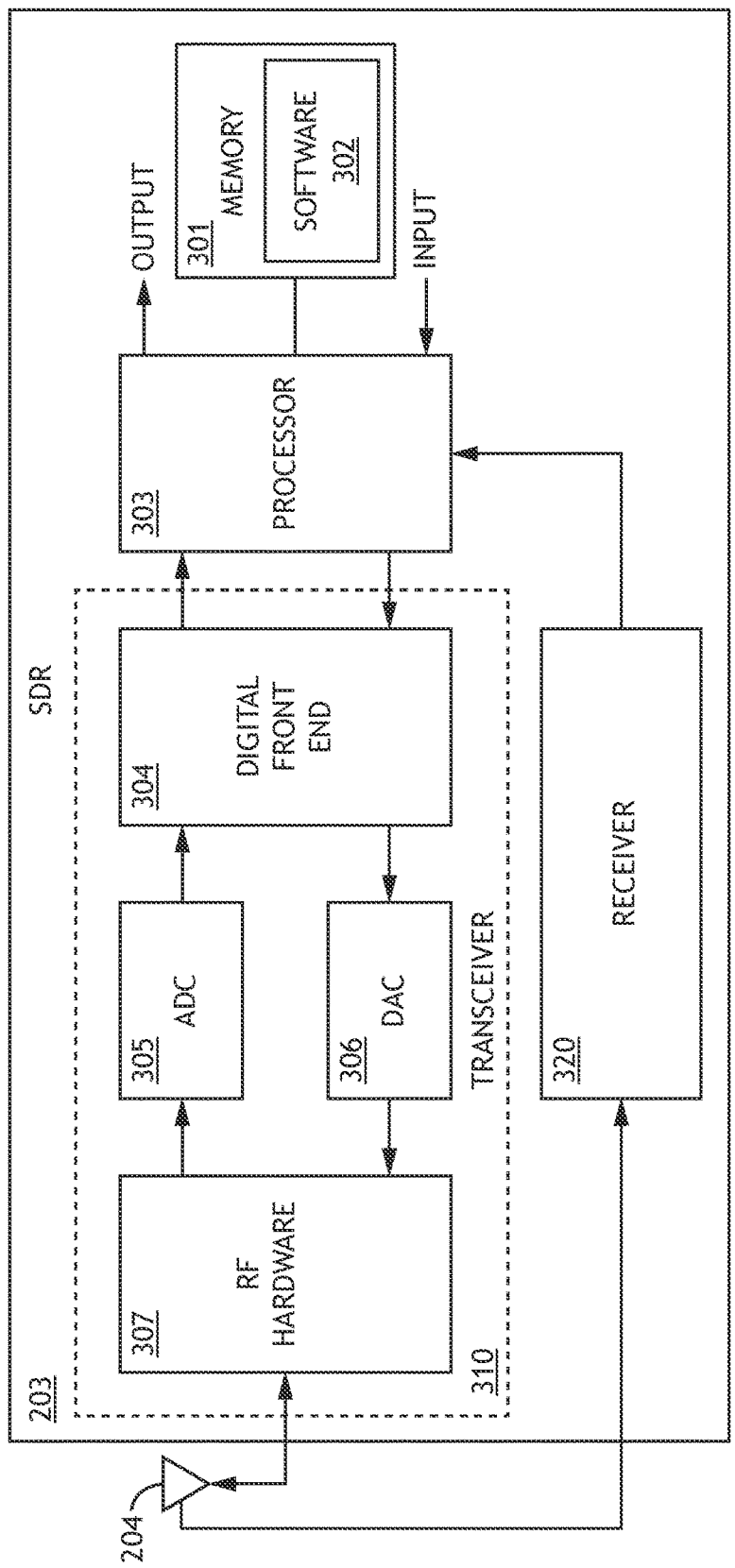
FIG. 3 depicts a software defined radio (SDR) coupled to an antenna of a communication system of a node of one embodiment.

Referring now to FIG. 3, an exemplary SDR 203 coupled to an exemplary SDR antenna 204 configured to send and receive signals or messages of one embodiment is shown. As shown in FIG. 3, the SDR 203 includes at least one transceiver 310, at least one receiver 320, at least one processor 303, and software 302 stored in a non-transitory computer readable medium (e.g., memory 301), some or all of which may be communicatively coupled. The processor 303 may be configured to perform any of various operations necessary performing of any of various functions of the SDR 203 of the node 110. Additionally, the processor 303 may be configured to run various software applications or computer code stored in a non-transitory computer-readable medium of the node 110 and configured to execute various instructions or operations as disclosed throughout and configured to perform any suitable functions.

The transceiver 310 is configured to perform the functionality of a receiver and transmitter. The transceiver 310 may also be referred to as a transceiver chain of the SDR 203. In some embodiments, the transceiver 310 may be considered as including a first receiver (e.g., a main receiver). In some embodiments, the SDR 203 may include multiple transceivers 310 or transceiver chains. The transceiver 310 may include radio frequency (RF) hardware 307, an analog-to-digital converter (ADC) 305, a digital-to-analog converter 306, and a digital front end 304. For example, the RF hardware 307 may include a power amplifier and a filter, and the digital front end 304 may be configured for channelization and sample rate conversion. The processor 303 may be configured to receive inputs such as timing signals from the GPS receiver and messages from computing device 112, and the processor 303 may perform operations on the received inputs by executing software 301 stored in memory 301 to provide digital signals to the digital front end 304, which in turn provides signals to the DAC 306 and the RF hardware 307, in effect emitting messages from the SDR antenna 204 to other nodes. Likewise, the processor 303 is configured to receive signals from the transceiver 310, and the processor 303 is configured to output messages, based on received signals, to a system or device of the node, such as the computing device 112. In one embodiment, the transceiver 310 may be implemented as a main half-duplex multi-band transceiver.

Additionally, the SDR 203 may include at least one receiver 320. The receiver 320 may also be referred to as a receiver chain of the SDR 203. In some embodiments, the receiver 320 may be considered as a second receiver (e.g., an auxiliary receiver). In some embodiments, the SDR 203 may include multiple receivers 320 or receiver chains. The processor 303 is configured to receive signals from the receiver 320, and the processor 303 is configured to output messages, based on received signals, to a system or device of the node, such as the computing device 112. In one embodiment, the receiver 320 may be implemented as a receive-only multi-band receiver. Embodiments may utilize the receiver 320 for receiving communication on an unjammed frequency in an EM contested environment.

Each of the at least one transceiver 310 and the at least one receiver 320 may be communicatively coupled to a same processor (e.g., 303, as shown) or separate processors (not shown), which may also be communicatively coupled.

While FIG. 3 depicts an exemplary SDR 203 having a particular configuration of particular components, it will be appreciated that suitable SDRs may include any suitable components, any suitable number of components, and any suitable arrangement of components. For example, an SDR 203 may be implemented as a multi-band SDR having multiple receive chains, such as an ARC-210 SDR or a Common Core SDR. For example, the ARC 210 has a main half-duplex multi-band transceiver and a receive-only multi-band receiver. Typically, the receive-only chain is used to implement guard or diversity reception; however, embodiments may utilize the receive-only chain for communication in an EM contested environment.

Figure 4:
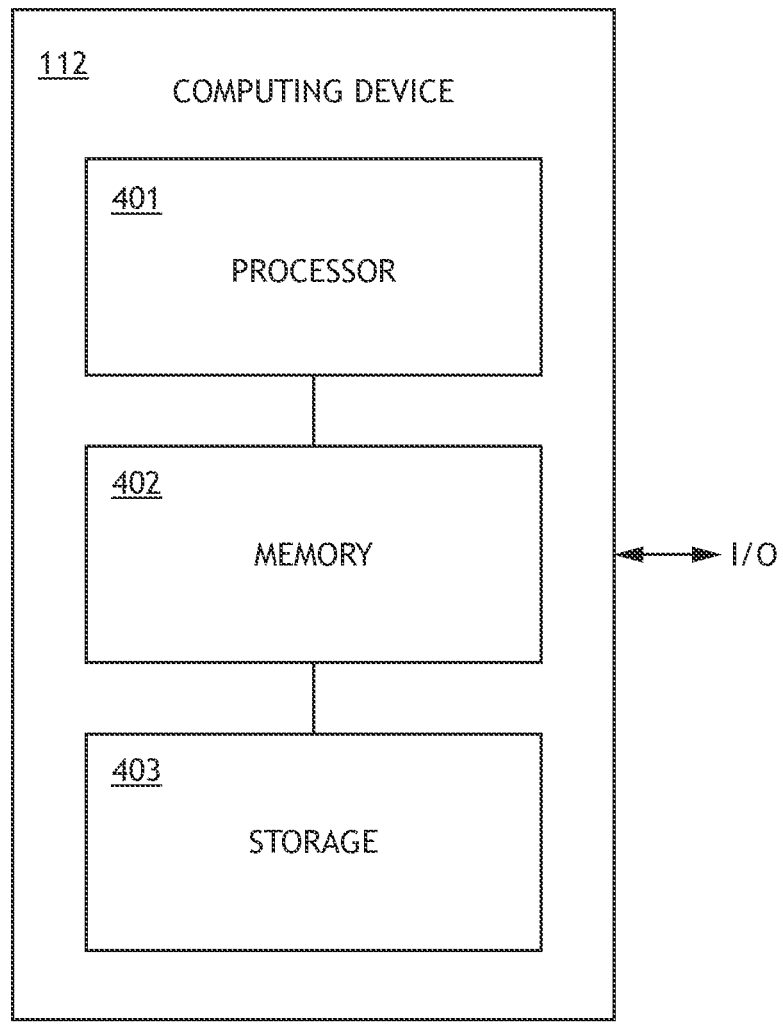
FIG. 4 depicts a computing device of a node of one embodiment.

Referring now to FIG. 4, the computing device 112 of the node 110 of one embodiment is shown. The computing device 112 includes at least one processor 401, memory 402, storage 403, as well as other components, equipment, and/or devices commonly included in a computing device of a node 110. The processor 401, the memory 402, and the storage 403, as well as any other components may be communicatively coupled. The processor 401 may be configured to perform any of various operations necessary for performing any of various functions of systems of the node 110. That is, the processor 401 may be configured to run various software applications or computer code stored in a non-transitory computer-readable medium (e.g., memory 402, storage 403, or the like) and configured to execute various instructions or operations as disclosed throughout and configured to perform any suitable functions. A user may be configured to interface with the computing device 112 via any suitable input/output devices coupled to the computing device 112, such as a display (e.g., a touchscreen display), a keyboard, a trackpad, a mouse, a speaker, a vibration unit, a camera, a microphone, or the like. For example, where a node 110 is implemented as an aircraft, one or any number of computing devices 112 may be configured for performing functions associated with operating the aircraft. While the node 110 is depicted as having one computing device 112, a node 110 may include any number of computing devices 112.

In some embodiments, a node 110 utilizing a particular waveform (e.g., eTDRS) is configured to report to other nodes of a network that the node 110 is in a jamming environment (e.g., enemy jamming or self-jamming). For example, where a user notices a communication degradation and determines that the node 110 is in a jamming environment, the processor 401 of the computing device 112 or a processor 303 of an SDR 203 may receive an instruction initiated by the user via a human machine interface or a remote control unit to send an EM contested mode indication or message to other nodes indicating that the node 110 is in a jamming environment.

Additionally, the processor 401 of the computing device 112 or a processor 303 of an SDR 203 may determine that the node 110 is in a jamming environment by maintaining (e.g., storing in a non-transitory computer readable medium such as memory 301, memory 402, or storage 403) and analyzing statistics (e.g., performance statistics, such as internal physical layer performance statistics) of various metrics, such as number of successful bursts received, CRC failures, acquisition failures, slot error rate, packet error rate, or the like. For example, when an SDR 203 receives a packet, the processor 401 of the computing device 112 or a processor 303 of an SDR 203 can determine that the packet was successfully received, or determine that there was some number of packet failures or that there were CRC failures. The processor 401 of the computing device 112 or a processor 303 of an SDR 203 is configured to analyze such statistics on a per frequency basis to determine trends like particular frequencies or sets of frequencies are experiencing or are likely experiencing jamming. Based on an analysis of such performance statistics, the processor 401 of the computing device 112 or a processor 303 of an SDR 203 may determine that the node 110 is in an "EM contested" mode and the node 110 can report the performance degradation to a user or send messages to be transmitted to neighbor nodes indicating that the node 110 is being jammed on a particular frequency or range of frequencies.

Further, for example, where an external device, such as spectrum harvesting and analysis device or application processor, determines that the node 110 is in a jamming environment, the processor 401 of the computing device 112 or a processor 303 of an SDR 203 may receive a message via the communication system 111 from the external device indicating that the node 110 is in a jamming environment. In response to the message from the external device, the processor 401 of the computing device 112 or a processor 303 of an SDR 203 may send an EM contested mode message via the communication system 111 to other nodes indicating that the node 110 is in a jamming environment.

Figure 5A:
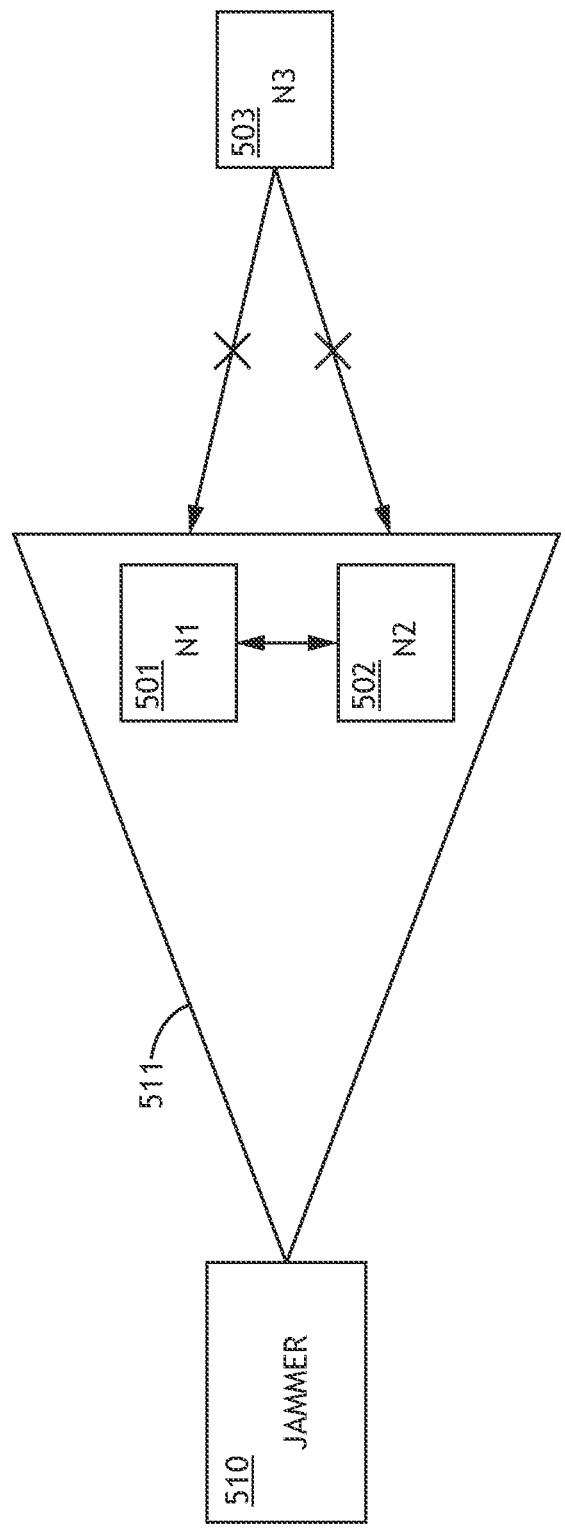
FIG. 5A depicts a diagram including a jammer jamming two nodes' ability to receive messages from another node of a network.

Referring now to FIG. 5A, a jammer 510 jamming node N1's 501 and node's N2 502 ability to receive messages from node N3 503 is illustrated. The jammer 510's communication deniability influence 511 shows that node N1 501 and node N2 502 are jammed by the jammer 510.

Figure 5B:
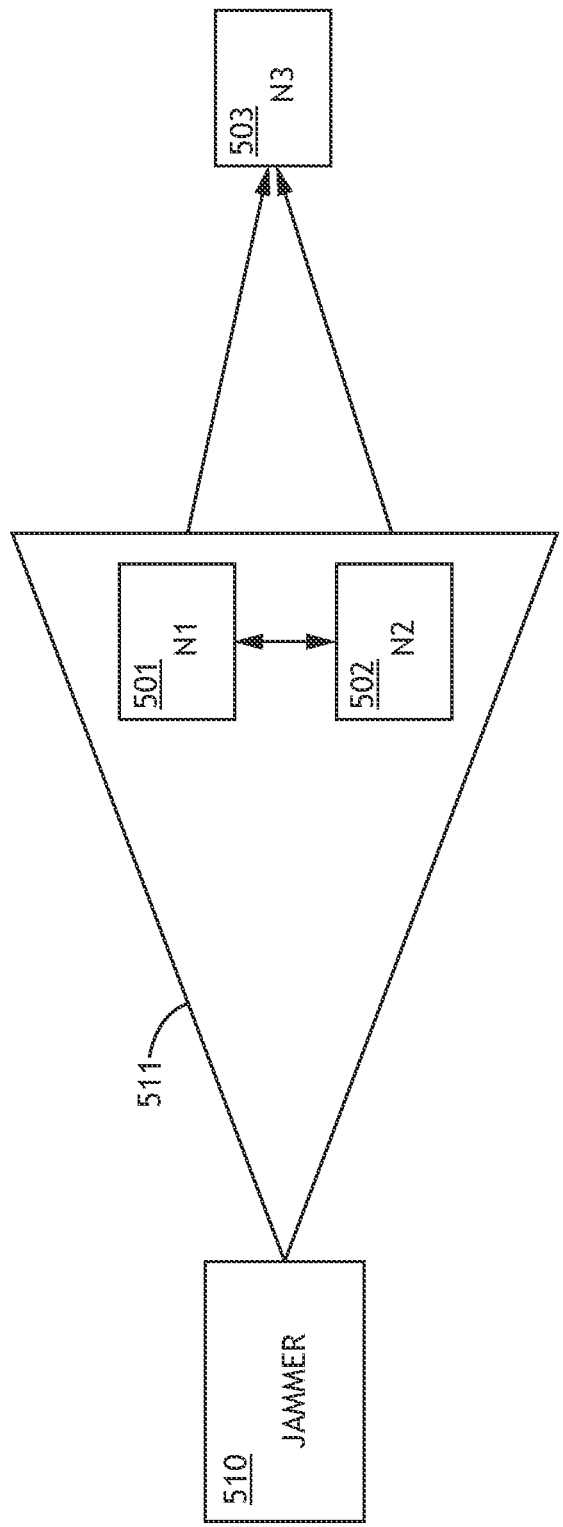
FIG. 5B depicts a diagram including a jammer jamming two nodes that retain the ability to send messages via unidirectional links to another node of a network of one embodiment.

Referring now to FIG. 5B, a diagram of the same scenario depicted in FIG. 5A is shown, except that the FIG. 5B illustrates that the node N1 501 and node N2 502 are able to send messages to node N3 503 over unidirectional links.

Referring to FIGS. 5A and 5B, together, jammers (e.g., jammer 510) cannot disrupt communication between all nodes at all times in a band of interest because jammers have a finite amount of power and jammers are typically located outside or near a fringe edge of a battle (e.g., a standoff distance exists between the jammer and nodes). Additionally, jammers (e.g., 510) cannot disrupt communication between all nodes at all times in a band of interest because of jamming geometry. For example, as shown in FIGS. 5A-B, nodes N1 501 and N2 502 are within the jammer's 510 communication deniability influence 511. Based on transmit power and distance between the nodes N1 501 and N2 502, the jammer 510 cannot disrupt bi-directional communication between nodes N1 501 and N2 502, but the jammer 510 can disrupt communication from node N3 503 to node N1 501 and from node N3 503 to node N2 502. However, the jammer 510 cannot prevent unidirectional communication from node N1 501 to node N3 503 and from node N2 502 to node N3 503.

Once each of nodes N1 501 and N2 502 determine that it is being jammed, each of the nodes N1 501 and N2 502 may send message(s) (e.g., EM contested mode messages) to other nodes in the network indicating that the particular node is being jammed. For example, node N1 501 may send EM contested mode messages to nodes N2 502 and N3 503 that node N1 501 cannot receive messages from node N3 503 over a current frequency, and additionally, the message may include an instruction for node N3 503 (and possibly other nodes) to communicate with node N1 501 over a different frequency. Similarly, node N2 502 may send EM contested mode messages to nodes N1 501 and N3 503. The information of the EM contested mode messages may be disseminated to one or more other nodes (not shown in FIGS. 5A and 5B) to allow other nodes of the network to determine how to react to the jamming event so that a decision can be made if a utilized waveform has to be altered to react to the jamming event. For example, if node N3 503 receives messages from N1 501 instructing to node N3 503 to communicate with node N1 501 on a particular unjammed frequency, node N3 503 may begin communicating with node N1 501 over the unjammed frequency and may disseminate such information to node N3 503's neighbors.

Figure 6:
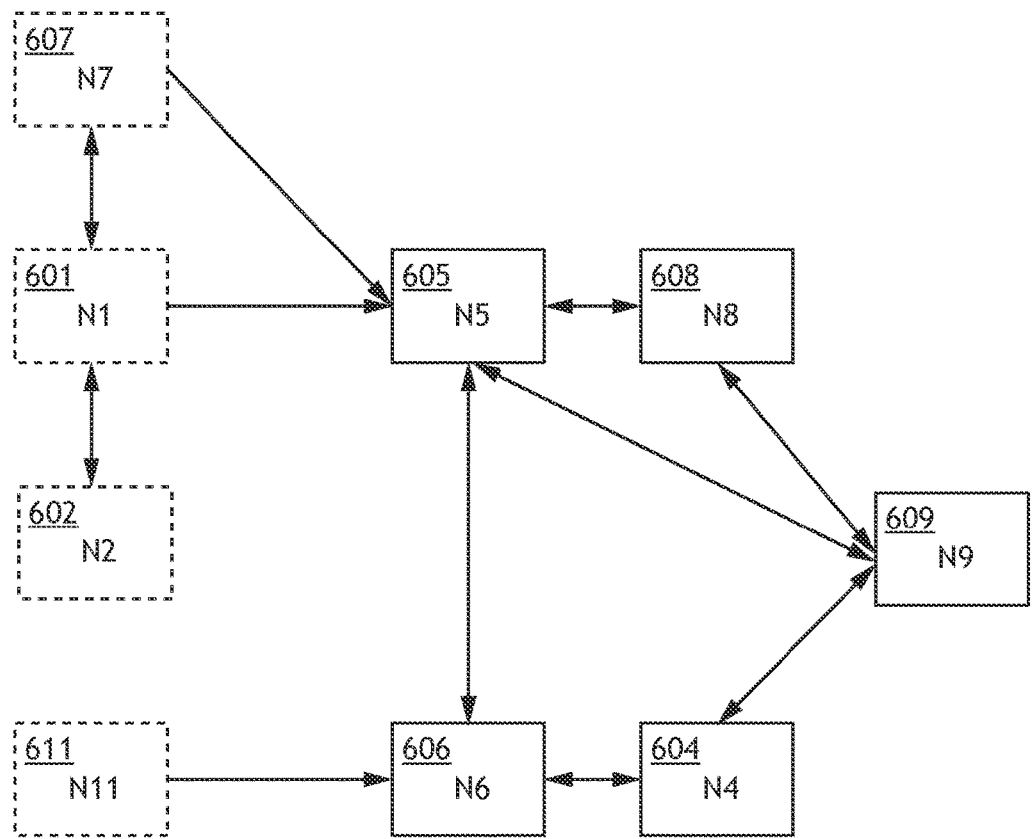
FIG. 6 depicts a diagram of an exemplary network of one embodiment.
Figure 6:
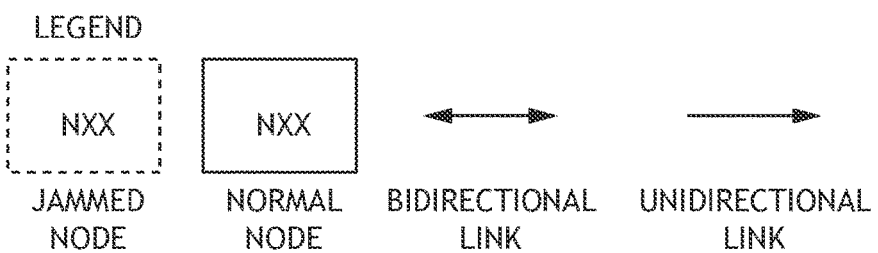

Referring now to FIG. 6, a network of jammed and unjammed nodes is depicted. Nodes N7 607, N1 601, N2 602, and N11 611 are jammed nodes. Nodes N5 605, N8 608, N9 609, N6 606, and N4 604 are unjammed nodes (which may be referred to as normal nodes). As illustrated in FIG. 6, only three communication conditions exist between any two nodes: (1) no communication (e.g., between N11 611 and N2 602); (2) unidirectional communication such that a jammer has prevented a node from being able to receive (e.g., between nodes N7 607 and N5 605, between nodes N1 601 and N5 605, and between nodes N11 611 and N6 606); and (3) bidirectional communication (e.g., between nodes N5 605 and N8 608, between nodes N8 608 and N9 609, or the like). FIG. 6 illustrates that jamming has effectively split the network into two networks (N1 601, N2 602, and N7 607 as a first network and N5 605, N6 606, N4604, N8 608, and N9 609 as a second network) and node N11 611 on its own. Most networking waveforms rely on bidirectional links and ignore unidirectional links, which causes network fragmentation and islanding. That is, ad-hoc networking waveforms typically mark a link usable only if bi-directional communication is possible, and as such, unidirectional links are discarded and current ad-hoc networking routing tables include only links that have bi-directional connectivity. For most networking waveforms where unidirectional links are ignored, if node N9 609 were the mission commander, all that node N9 609 would know is that nodes N1 601, N2 602, N7 607, and N11 611 are not in the network. Embodiments allow jammed nodes (e.g., nodes N7 607, N1 601, and N11 611) to report their EM environment via unidirectional links with other nodes.

All SDRs utilizing ad-hoc networking waveforms have some mechanism to determine a network topology and create a routing table. Some embodiments including SDRs 230 utilize a suitable waveform (e.g., eTDRS waveform) that uses periodic bootstrap messages to report their "EM environment" (e.g., jammed, jammed on particular frequencies, or unjammed). Nodes use bootstrap messages to broadcast their one-hop and two-hop neighbors for MANET routing. In embodiments, bootstrap messages can be sent over a unidirectional link or a bidirectional link. A node that receives boot strap messages from its neighbors can determine the EM environment of its neighbors. For example, if node N5 605 receives boot strap messages from its one hop and two hop neighbors, node N5 605 will determine that nodes N7 607, N1 601, N2 602, and N11 611 are jammed nodes and that nodes N8 608, N9 609, N6 606, and N4 604 are unjammed nodes.

A node that receives bootstrap messages may determine if any of their one-hop neighbors are in an EM contested environment. In typical networks, a neighbor is not considered to be a neighbor unless bidirectional communication is possible between two nodes. As such, in typical networks, if only unidirectional communication is possible, a routing table will not be updated with the neighbor information. In embodiments, however, the 1-hop and 2-hop neighbor list will be updated by utilizing information received from bootstrap messages to add nodes for which only unidirectional communication is possible, i.e., the list will identify any nodes whose bootstrap messages are received (whether via a bidirectional link or unidirectional link). This will help ensure that the EM environment status of each node will be propagated throughout the network. While ad-hoc routing protocol (e.g., optimized link state routing (OLSR) protocol in the case of eTDRS) does not use the unidirectional links, all nodes periodically exchange bootstrap messages, and over time the network can determine the "EM environment" of all the nodes in the network by utilizing received bootstrap messages. Embodiments include each node maintaining (e.g., by storing in a non-transitory computer readable medium) a one-hop and two-hop neighbor list that includes information of unidirectional links and neighbor nodes' EM environment status obtained from bootstrap messages.

Additionally, a network management tool executed by a processor (e.g., 401) may output data of the EM environment of the network for presentation to one or more users (e.g., decision makers, such as a platoon leader, a company commander, etc.) that may indicate to one or more users that some nodes of the network are operating in an "EM contested environment".

Nodes of embodiments may include multi-band SDRs (such as ARC-210 radios, TrueNet family radios, or the like) with multiple receivers (e.g., a receiver of a transceiver 310 and receiver 320). For example, the ARC-210 has a main half-duplex multi-band transceiver and a receive-only multi-band receiver. While, typically, the receive-only chain is used to implement guard or diversity reception, embodiments include retargeting (e.g., recalibrating) a receive-only chain of an SDR 203 for communication in an EM contested environment.

Embodiments include a method of reestablishing bidirectional communication in an EM contested environment. Jamming all possible communication in all bands is feasible only in a very small area. Realistically, an enemy jammer (e.g., 510) has to pick frequency patches to jam so that it can deafen a subset of the nodes (e.g., 501, 502) within the network, for example, as shown in FIGS. 5A-B. Embodiments include a method to reestablish bidirectional communication by a jammed node (e.g., 501, 502) which is being jammed on a jammed frequency, Fy, which a first receiver (e.g., a receiver portion of transceiver 310, which may also be referred to as a main receiver) may be tuned to, based on a pseudorandom algorithm and frequency table that is in use by an SDR 203. A method may include scanning a frequency coverage range (e.g., an entire frequency coverage range) of a second receiver (e.g., receiver 320, such as a receive-only multiband receiver), which may also be referred to as an auxiliary receiver. For example, an ARC-210 radio scanning a frequency coverage range may include scanning over a 30-400 megahertz (MHz) range, and a TrueNet SDR scanning a frequency coverage range may include scanning over a 30-1850 MHz range. The method may also include identifying (e.g., by a processor 303 or 401) unused frequencies that are not used by anything else, and hence, not jammed. The method may further include selecting (e.g., randomly selecting, pseudo-randomly selecting, selecting an identified frequency furthest from a used frequency, or the like), by a processor 303 or 401, a particular unused frequency, Fx, for communicating in the EM contested environment. The method additionally may include reporting the selected unused frequency by transmitting (e.g., by the SDR 203) one or more periodic bootstrap messages to one or more nodes that are able to receive the jammed node's communication. Once the one or more nodes receive the bootstrap message with the selected unused frequency, Fx, the one or more receiving nodes further propagate the information to other nodes of the network such that a majority of the nodes in the network may determine that the node can be reached on frequency, Fx, (e.g., by using the second receiver (e.g., an auxiliary receiver)) instead of the jammed frequency, Fy, to which the first receiver may still be tuned to based on a pseudorandom algorithm and frequency table in use. The method to reestablish bidirectional communication by jammed nodes (e.g., 501, 502) may be performed iteratively if the jammer (e.g., 510) begins jamming the selected frequency, Fx, such that the method is repeated to adapt to unjammed frequencies. Performance of the method allows for the jammed nodes (e.g., 501, 502) to have, at minimum, degraded communication rather than total isolation. Additionally, selecting frequencies that are far apart or potentially in different bands may also cause the jammer (e.g., 510) to spread its energy across multiple frequencies, which may result in regained communication using the first receiver (e.g., main receiver).

Further, in embodiments where there are multiple jammed nodes (e.g., nodes N1 601, N2 602, N7 607, and N11 611, as shown in FIG. 6), frequency selection enhancements (e.g., optimizations) to improve network functionality are possible. For example, in FIG. 6, jammed nodes N1 601, N2 602, N7 607, and N11 611 may each select different unused frequencies, Fx1, Fx2, Fx3, Fx4, for example, if each jammed node selects a different frequency from the free frequencies (e.g., detected by the second receiver (e.g., auxiliary receiver) scanning output) list. The use of four different frequencies by the nodes N1 601, N2 602, N7 607, and N11 611 would force the jammer to spread its energy over more frequencies, thereby reducing the impact of the jammer on the network. That is, increasing a spacing between the selected frequencies makes it more difficult for the jammer.

Additionally, for example, as shown in FIG. 6, because node N1 601 is able to bidirectionally communicate with nodes N2 602 and N7 607 due to location geometry, nodes N1 601, N2 602, and N7 607 may collaborate to select a same frequency, Fx, for each of the nodes N1 601, N2 602, and N7 607. That is, each of the nodes N1 601, N2 602, and N7 607 may determine that they can communicate with one another as a sub-network by referencing a routing table list, and one of the nodes N1 601, N2 602, and N7 607 may select an unused frequency, Fx, for communication by the second receiver (e.g., auxiliary receiver). The particular selecting node may then report the selected frequency, Fx, to the other nodes (e.g., the two other nodes of nodes N1 601, N2 602, and N7 607) of the sub-network such that the nodes N1 601, N2 602, and N7 607 all select the same auxiliary frequency, Fx. Because nodes N1 601, N2 602, and N7 607 collaborated to select the same auxiliary frequency, Fx, if any one of the jammed nodes N1 601, N2 602, and N7 607 receives a message from another node, such receiving node can relay the message to the other jammed nodes, thereby improving the likelihood that the message is received by the intended recipient node (or by all of the jammed nodes N1 601, N2 602, and N7 607).

Embodiments include methods of maintaining a node's time synchronization with its network. Embodiments utilizing electronic counter-counter measure (ECCM) waveforms need to be aligned in time and frequency to be able to communicate with each other. When a node is being jammed (e.g., cannot hear from other nodes), over time the node may lose its ability to be time aligned with other nodes because of drift in the node's timing source. After a threshold amount of time, the drift will result in the node being unable to hear from other nodes because the node will be tuned to a different frequency than other nodes are transmitting on.

In embodiments where a node's only available time source is from time updates from other nodes (e.g., where the node does not include an atomic clock and does not include an operational GPS receiver 202 (e.g., the node does not have a GPS receiver 202 or the GPS receiver 202 is jammed)), a node in a "contested EM environments" can request time updates (e.g., periodic time requests) from other nodes that can hear the requesting node. The other nodes that hear a periodic time request may send periodic synchronization bursts to the requesting node so that the requesting node and other nodes can maintain time and frequency synchronization.

For example, referring again to FIG. 6, if nodes N5 605 and N6 606 periodically transmit synchronization bursts to nodes N1 601, N2 602, N7 607, and N11 611 using the frequency, Fx (or Fx1, Fx2, Fx3, and Fx4, if nodes have different selected frequencies), selected by their auxiliary receivers, as described above. The nodes N1 601, N2 602, N7 607, and N11 611 can maintain network synchronization as long as needed. The overheads for re-transmitting time-synchronization bursts are not very high as the update rate can be spaced an hour apart, for example, if needed. The actual update rate can be modified if needed.

In embodiments where a node has an available time source that includes an operational GPS receiver 202 (e.g., an unjammed GPS receiver 202 that is able to receive GPS signals), the node will be able to maintain time and frequency synchronization with the rest of nodes in the network. For example, if node N7 607 has an operational GPS receiver 202, nodes N1 601, N2 602, and N7 607 can maintain time synchronization with the network for as long as needed since nodes N1 601, N2602, and N7 607 can communicate with each other. Additionally, nodes N1 601, N2 602, and N7 607 also have position information which can be relayed back to the network. For example, by sending position information to the network (such as to node N5 605, which can disseminate the position information to other nodes of the network), a mission commander node can instruct at least one other node (such as node N6 606) to move into a position to prevent node isolation with respect to the jammed nodes (e.g., nodes N1 601, N2 602, and N7 607), for example, as shown in FIG. 7 described below.

Figure 7:
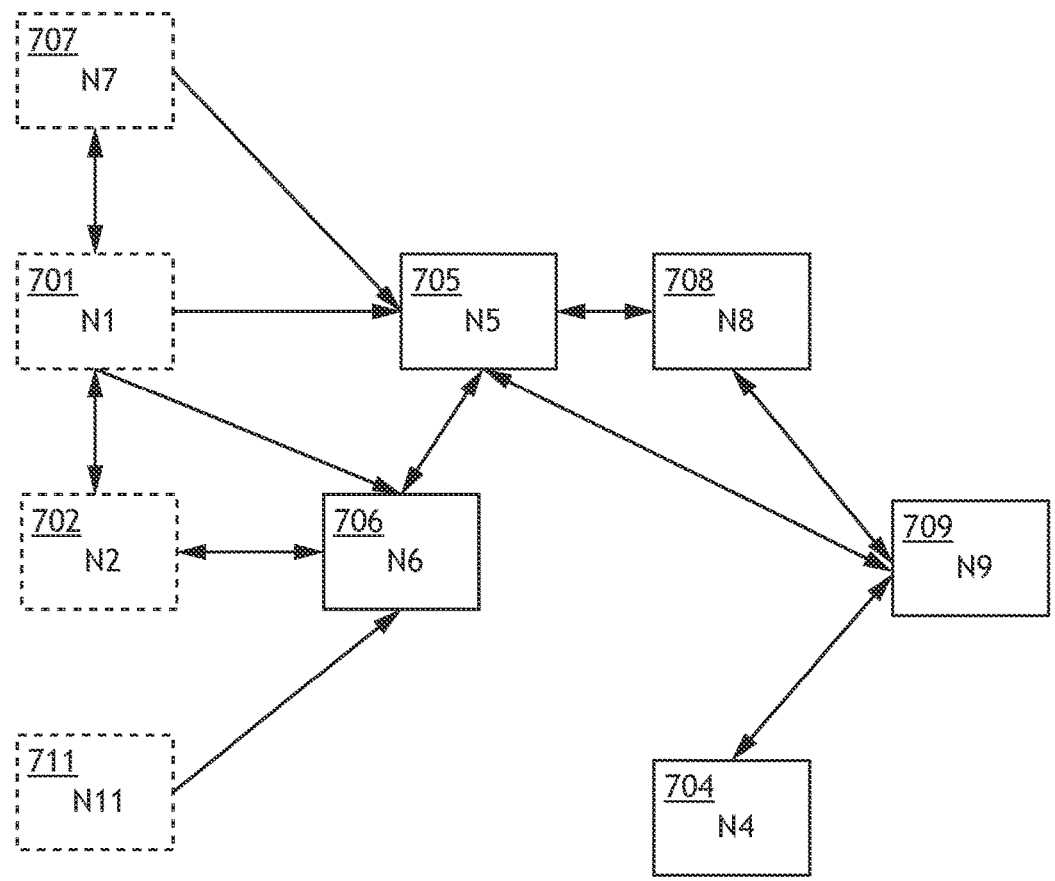
FIG. 7 depicts a diagram of the exemplary network depicted in FIG. 6 at a different point in time of one embodiment.
Figure 7:
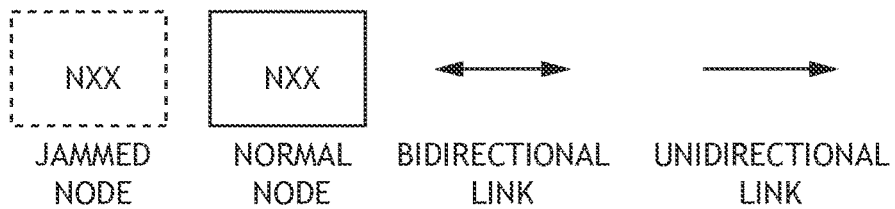

Referring now to FIG. 7, a network of jammed and unjammed nodes is depicted. The network depicted in FIG. 7 is the same network depicted in FIG. 6 except that node N6 706 (606 in FIG. 6) has been repositioned to reduce network islanding, which results in some of the communication states (e.g., bidirectional communication, unidirectional communication, and no communication) between nodes of the network being different in FIG. 7. In FIG. 7, nodes N7 707, N1 701, N2 702, and N11 711 are jammed nodes. Nodes N5 705, N8 708, N9 709, N6 706, and N4 704 are unjammed nodes. By moving node N6 706 just outside the jammer's influence, nodes N1 701, N2 702, and N7 707 can maintain time and frequency alignment with the entire network because nodes N2 702 and N6 706 now have a bidirectional link. In FIG. 7, only node N11 711 is at risk of losing time synchronization. If node N11 711 does not have an alternate timing source, a potential loss of time synchronization for node N11 711 can be avoided if node N6 706 periodically transmits to node N11 711 time synchronization bursts on frequency, Fx, which may be selected by node N11 711 during performance of a method of reestablishing bidirectional communication in an EM contested environment.

In embodiments where a node has non-chip-scale atomic clock (e.g., a rubidium atomic clock, a cesium atomic clock, or the like), the node can maintain synchronization with the network for as long as needed. Additionally, the node can provide time synchronization bursts for all nodes that the node is able to communicate with.

In embodiments where a node has a GPS receiver 202 (e.g., a MicroGRAM GPS receiver) with an integrated CSAC 205, the node will have accurate time and position information synchronization with the network as long as GPS signals are available. If, for example, GPS is denied, the node can rely on the CSAC 205 for accurate time information for extended periods of time (e.g., up to 11 days and depending on the available accuracy of the particular CSAC 205 implemented on the node). In one embodiment, an exemplary CSAC 205 can go 5.78 days in a GPS denied environment and still suffer only a 1 millisecond time drift; however, the node may not have position information due to the GPS denied environment. Additionally, for example, SDRs 203 which utilize the eTDRs waveform currently have synchronization slots that can handle 2 milliseconds of drift while maintaining time synchronization; a node implemented with the CSAC 205 would an enable an SDR 203 utilizing the eTDRS waveform to operate with time synchronization for 11 days in a GPS denied waveform jamming environment.

Figure 8:
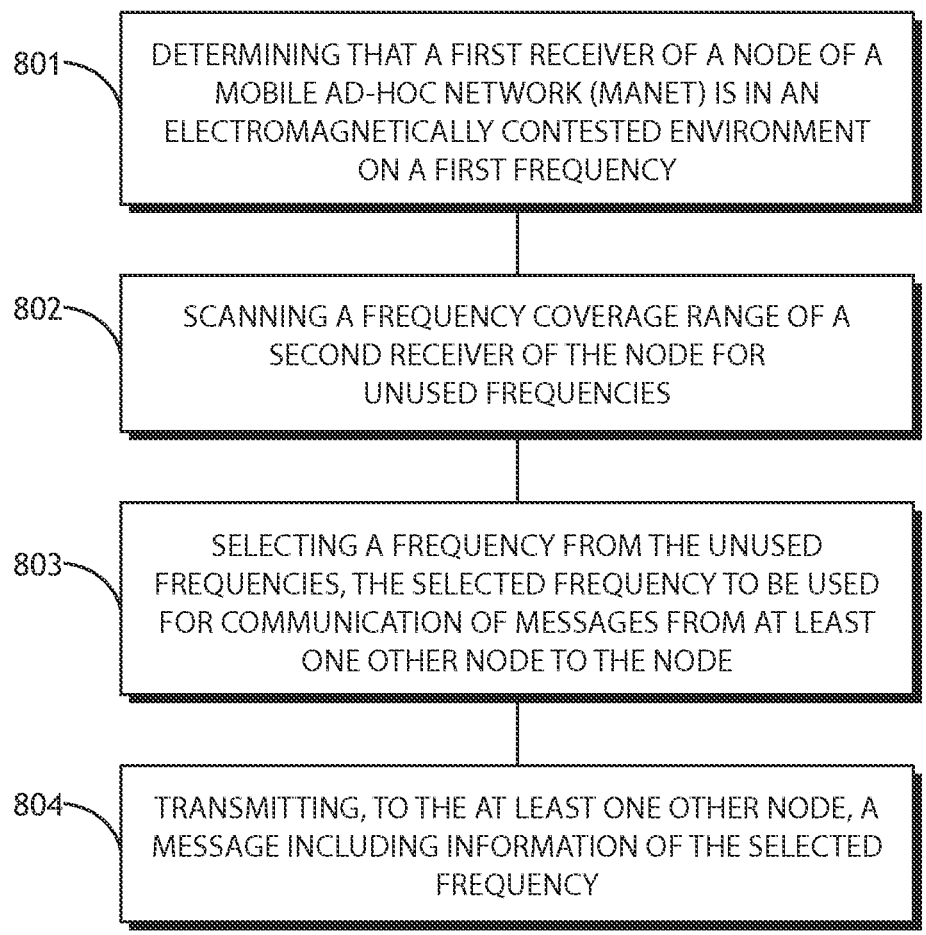
FIG. 8 depicts a flow diagram of a method of operating a node of a MANET of one embodiment.

Referring now to FIG. 8, a method of operating a node of a MANET of one embodiment is shown. For example, the method may include a step 801 of determining (e.g., by processor 401 or processor 303) that a first receiver of a node of a MANET is in an electromagnetic contested environment for a first frequency (e.g., a frequency the radio is currently using at an instant and this frequency can change in a next instant). The method may also include a step 802 of scanning (e.g., by a communication system 111, a radio, such as SDR 203, or a receiver 320 of the SDR 203) a frequency coverage range of a second receiver of the node for unused frequencies. The method may additionally include a step 803 of selecting (e.g., by processor 401 or processor 303) a frequency from the unused frequencies, the selected frequency to be used for communication of messages from at least one other node to the node via the second receiver. Some embodiments may include multiple SDRs 203 (e.g., multiple ARC-210 radios), and only one second receiver (e.g., the auxiliary receiver of the SDR 203 or a main receiver of a different on-board SDR 203) of one SDR 203 may be needed such that the second receiver need not be in the same SDR 203 as the first receiver. That is, the second receiver of a particular SDR 203 can be shared with other on-board SDRs 203, or a second receiver (e.g., a main receiver or auxiliary receiver) of another (e.g., a spare) SDR on-board the node can be utilized. The method may further include a step 804 of transmitting (e.g., by a communication system 111 or a radio, such as SDR 203), to the at least one other node, a message including information of the selected frequency; that is, the information may be transmitted to all nodes in the network that can hear. Further, the method may include any of the operations disclosed throughout.

Figure 9:
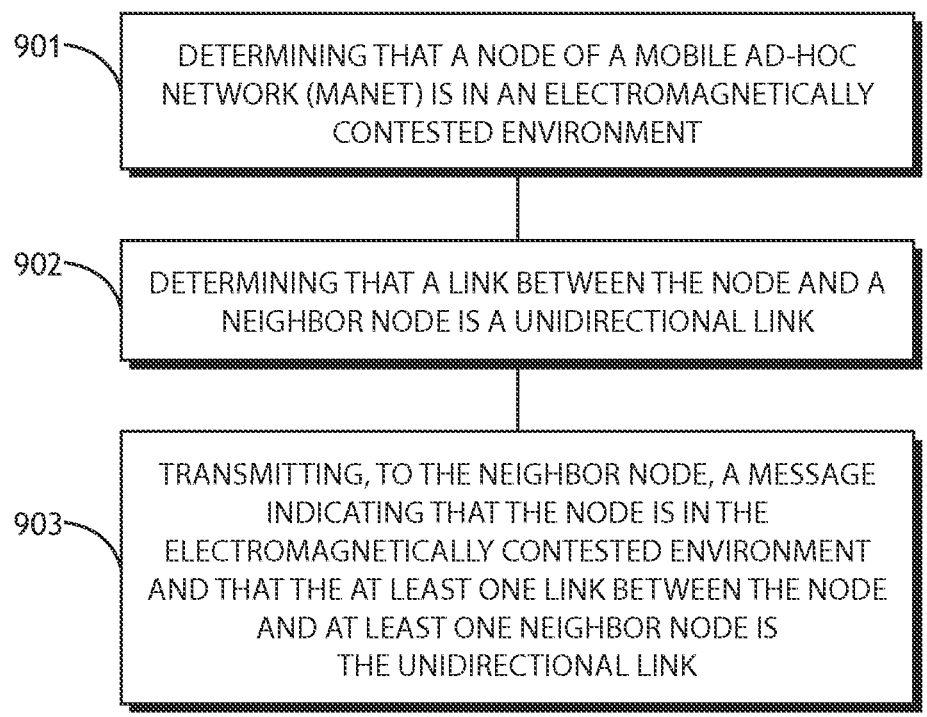
FIG. 9 depicts a flow diagram of a method of operating a node of a MANET of one embodiment.

Referring now to FIG. 9, a method of operating a node of a MANET of one embodiment is shown. For example, the method may include a step 901 of determining (e.g., by processor 401 or processor 303) that a node of a MANET is in an electromagnetic contested environment, such as by referencing a routing table that includes information of bidirectional links and unidirectional links. The method may also include a step 902 of determining (e.g., by processor 401 or processor 303) that a link between the node and a neighbor node is a unidirectional link. The method may additionally include a step 903 of transmitting (e.g., by a communication system 111 or a radio, such as SDR 203), to the neighbor node, a message indicating at least that the node is in the electromagnetic contested environment and that the link between the node and the neighbor node is the unidirectional link. The method may further include prioritizing communication over bidirectional links if in non-contested environments and over both links in jammed environments. The method may also include searching connectivity to a specific link, determining if the connectivity is unidirectional or bidirectional, and perform a different set of actions based on whether the connectivity is bidirectional or unidirectional. Additionally, If multiple receivers are available on-board, the method may include instructing or performing communication over multiple links simultaneously such that the sender (e.g., a sending node) can select one of the frequencies in a pseudo-random manner so as to force the jammer to jam more (e.g., all) frequencies to jam the receiver. Further, the method may include any of the operations disclosed throughout.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is believed that embodiments of the inventive concepts disclosed herein and many of their attendant advantages will be understood by the foregoing description, and it will be apparent that various changes can be made in the form, construction, and arrangement of the components thereof without departing from the scope of the inventive concepts or without sacrificing all of their material advantages. The form herein before described being merely an explanatory embodiment thereof, it is the intention of the following claims to encompass and include such changes.

What is claimed is:

1. A method, comprising:
    creating a routing table of nodes in a mobile ad-hoc network (MANET) by sending hello messages to at least one neighbor node;
    determining one or more unidirectional links based on a failure to receive hello messages from the at least one neighbor node;
    creating a topology of nodes based on the routing table and determined unidirectional links;
    determining that a first receiver of a node of the MANET is in an electromagnetic contested environment for a first frequency by analyzing the topology and performance statistics including at least one metric of cyclic redundancy check (CRC) failures;
    scanning a frequency coverage range of a second receiver of the node for unused frequencies, wherein the second receiver is a receive-only receiver;
    selecting a frequency from the unused frequencies, the selected frequency to be used for communication of messages from at least one other node of the MANET to the node via the second receiver;
    determining a time of the node from an atomic clock implemented on the node of the MANET; and
    transmitting, to the at least one other node via a unidirectional link, a message including information of the selected frequency and the time of the node via a transmitter.

2. The method of claim 1, further comprising:
    receiving, by the second receiver of the node and from the at least one other node, a message over the selected frequency.

3. The method of claim 1, further comprising:
receiving, by the second receiver of the node and from the at least one other node, a time synchronization burst over the selected frequency; and
updating node time based on the time synchronization burst.

4. The method of claim 1, further comprising:
determining that the second receiver of the node is in a second electromagnetic contested environment for the selected frequency;
scanning the frequency coverage range of the second receiver of the node for updated unused frequencies;
selecting a second frequency from the updated unused frequencies, the second selected frequency to be used for communication of messages from the at least one other node to the node via the second receiver; and
transmitting, to the at least one other node, an updated message including information of the second selected frequency.

5. The method of claim 1, wherein transmitting, to the at least one other node, a message including information of the selected frequency via a transmitter further comprises:
transmitting, to the at least one other node, a message including information of the selected frequency and information that the node is in the electromagnetic contested environment via a transmitter.

6. The method of claim 1, wherein transmitting, to the at least one other node, a message including information of the selected frequency via a transmitter further comprises:
transmitting, to the at least one other node, a message including information of the selected frequency, information that the node is in the electromagnetic contested environment, and information of unidirectional links that the node has with the at least one other node via a transmitter.

7. The method of claim 1, further comprising:
receiving at least one global positioning system (GPS) signal; and
determining a time and a position of the node based on the GPS signal,
wherein transmitting, to the at least one other node, a message including information of the selected frequency via a transmitter further comprises:
transmitting, to the at least one other node, a message including information of the selected frequency, the time of the node, and the position of the node via a transmitter.

8. The method of claim 1, wherein the atomic clock is a chip scale atomic clock.

9. The method of claim 8, wherein the atomic clock is a chip scale atomic clock integrated in a global positioning system (GPS) receiver.

10. The method of claim 1, wherein determining that a first receiver of a node of a mobile ad-hoc network (MANET) is in an electromagnetic contested environment for a first frequency further comprises:
determining that a first receiver of a node of a mobile ad-hoc network (MANET) is being jammed for a first frequency.

11. The method of claim 1, wherein the performance statistics further include at least one metric of at least one of a number of successful bursts received, acquisition failures, slot error rate, or packet error rate.

12. The method of claim 1, wherein determining that a first receiver of a node of a mobile ad-hoc network (MANET) is in an electromagnetic contested environment for a first frequency further comprises:
determining that a first receiver of a node of a mobile ad-hoc network (MANET) is in an electromagnetic contested environment for a first frequency based on a failure to receive complete messages from the at least one other node.

13. The method of claim 1, wherein determining that a first receiver of a node of a mobile ad-hoc network (MANET) is in an electromagnetic contested environment for a first frequency further comprises:
determining that a first receiver of a node of a mobile ad-hoc network (MANET) is in an electromagnetic contested environment for a first frequency based on a user input.

14. The method of claim 1, wherein determining that a first receiver of a node of a mobile ad-hoc network (MANET) is in an electromagnetic contested environment for a first frequency further comprises:
determining that a first receiver of a node of a mobile ad-hoc network (MANET) is in an electromagnetic contested environment for a first frequency based on a message received from an external device.

15. The method of claim 1, further comprising:
determining that one or more neighbor nodes are in one or more electromagnetic contested environments, and
wherein the selected frequency to be used for communication of messages from at least one other node to the node is a same frequency as selected frequencies of the one or more neighbor nodes to be used for communication of messages from other nodes to the one or more neighbor nodes.

16. A method, comprising:
creating a routing table of nodes in a mobile ad-hoc network (MANET) by sending hello messages to at least one neighbor node;
determining one or more unidirectional links based on a failure to receive hello messages from the at least one neighbor node;
creating a topology of nodes based on the routing table and determined unidirectional links;
determining that a node of the MANET is in an electromagnetic contested environment by analyzing the topology and performance statistics including at least one metric of cyclic redundancy check (CRC) failures; and
transmitting, to the neighbor node, a message indicating at least that the node is in the electromagnetic contested environment and that the link between the node and the neighbor node is the unidirectional link.

17. A node of a mobile ad-hoc network (MANET), comprising:
at least one radio including a first receiver, a transmitter, and a second receive-only receiver, wherein the at least one radio is configured to scan a frequency coverage range of the second receive-only receiver for unused frequencies;
an atomic clock implemented on a node of a mobile ad-hoc network (MANET) and configured to determine a time of the node; and
at least one processor configured to:
create a routing table of nodes in the MANET by sending hello messages to at least first hop neighbor nodes;
determine one or more unidirectional links based on a failure to receive hello messages from the at least first hop neighbors;
create a topology of nodes based on the routing table and determined unidirectional links;

determine that the first receiver of the node of the MANET is in an electromagnetic contested environment for a first frequency by analyzing the topology and performance statistics including at least one metric of cyclic redundancy check (CRC) failures; and select a frequency from the unused frequencies, the selected frequency to be used for communication of messages from at least one other node of the MANET to the node via the second receive-only receiver, wherein the at least one radio is configured to transmit, to the at least one other node via a unidirectional link, a message including information of the selected frequency and the time of the node via the transmitter.

* * * * *